United States Patent

Sugaya et al.

[15] 3,696,216

[45] Oct. 3, 1972

[54] SCANNING MAGNETIC HEAD

[72] Inventors: Hiroshi Sugaya, Suita; Kenji Kanai, Osaka, both of Japan

[73] Assignee: Matsushita Electric Industrial Co., Ltd., Osaka, Japan

[22] Filed: June 25, 1970

[21] Appl. No.: 49,740

[30] Foreign Application Priority Data

July 2, 1969 Japan ......................44/53631

[52] U.S. Cl. ....................179/100.2 C, 179/100.2 CF, 179/100.2 T, 340/174.1 F

[51] Int. Cl. ..........G11b 5/20, G11b 5/30, G11b 5/02

[58] Field of Search ...............179/100.2 CF, 100.2C, 100.2 MI; 340/174.1 F; 346/74 MC

[56] References Cited

UNITED STATES PATENTS

| | | | |
|---|---|---|---|
| 3,382,325 | 5/1968 | Cameras | 179/100.2 C |
| 2,955,169 | 10/1960 | Stedtnitz | 179/100.2 T |
| 3,175,049 | 3/1965 | Gabor | 179/100.2 T |
| 3,435,440 | 3/1969 | Nallin | 340/174.1 F |

*Primary Examiner*—Bernard Konick
*Assistant Examiner*—Alfred H. Eddleman
*Attorney*—Stevens, Davis, Miller & Mosher

[57] ABSTRACT

A scanning magnetic head with a closed magnetic circuit including a head gap impressed with a recording signal magnetic field. A pair of closed magnetic circuits respectively including a part of the closed magnetic circuit are provided on the opposite sides of the head gap. The magnetic head is impressed with a pair of symmetrical form of the scanning magnetic fields on the opposite sides thereof so that the influence of the scanning magnetic field on the recording medium may be reduced.

11 Claims, 35 Drawing Figures

PRIOR ART FIG. 1
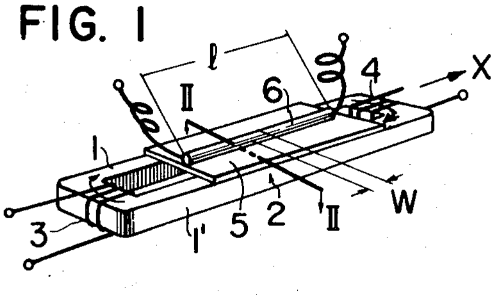
PRIOR ART FIG. 2
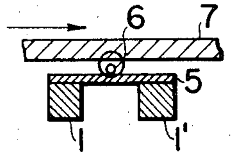
FIG. 3
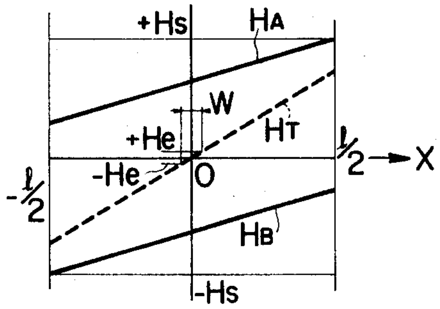
FIG. 4
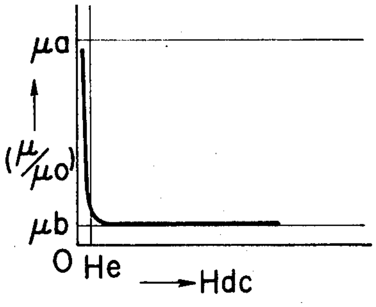
FIG. 5
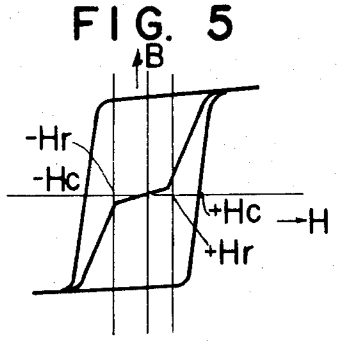
H. SUGAYA & K. KANAI
INVENTORS
BY Stevens, Davis, Miller & Mosher
ATTORNEYS

SCANNING MAGNETIC HEAD

The present invention relates to a magnetic head of the stationary type, and in particular to a scanning magnetic head in which a magnetic scanning means makes the relative speed of the recording medium with the stationary magnetic head higher than the running speed of the recording medium.

A great deal of difficulty has been experienced in making the relative speed of the recording medium with the magnetic head higher than the running speed of the recording medium in the magnetic recording techniques. One of the examples of the prior devices designed for increasing the relative speed of the recording medium with the magnetic head is a rotary head which has been employed in the rotary head type magnetic video recording and reproducing apparatus. The rotary magnetic head is rotated at a high speed in the direction normal or inclined to the advancing direction normal or inclined to the advancing direction of the recording medium or tape in contact therewith. On account of the fact that the small head is mechanically rotated at a high speed, it has been disadvantageous from the point of economy to employ the rotary magnetic head due to the problem in structural accuracy, control of rotation and the like. And due to the high speed rotation of the magnetic head, there has been a risk of mechanically breaking the head construction in such a type of magnetic recording apparatus.

It is therefore an object of the present invention to provide a magnetic head which enables the increase in the relative speed of the recording medium with the head without employing a head rotating means.

Another object of the present invention is to provide a magnetic head of the stationary type in which the influence of the scanning magnetic field on the recording medium is reduced.

A further object of the present invention is to provide a scanning magnetic head of the stationary type in which a pair of symmetrical scanning magnetic fields are provided on the opposite sides of the head gap thereof so that the influence of the scanning magnetic field on the recording medium may be reduced.

Other objects and a fuller understanding of the present invention may be had by referring to the following description and claims taken in conjunction with the accompanying drawings in which:

FIG. 1 is a perspective view showing a known construction of the scanning magnetic head;

FIG. 2 is a cross-sectional view taken along the line II— II in FIG. 1;

FIG. 3 is a diagram showing the magnetic field distribution effected by the magnetic head shown in FIG. 1;

FIG. 4 is a diagram showing the magnetic characteristic of the magnetic thin plate employed in the magnetic head shown in FIG. 1;

FIG. 5 is a diagram showing the hysteresis loop of the recording medium;

Figures 6A, 6B, 7, 8:
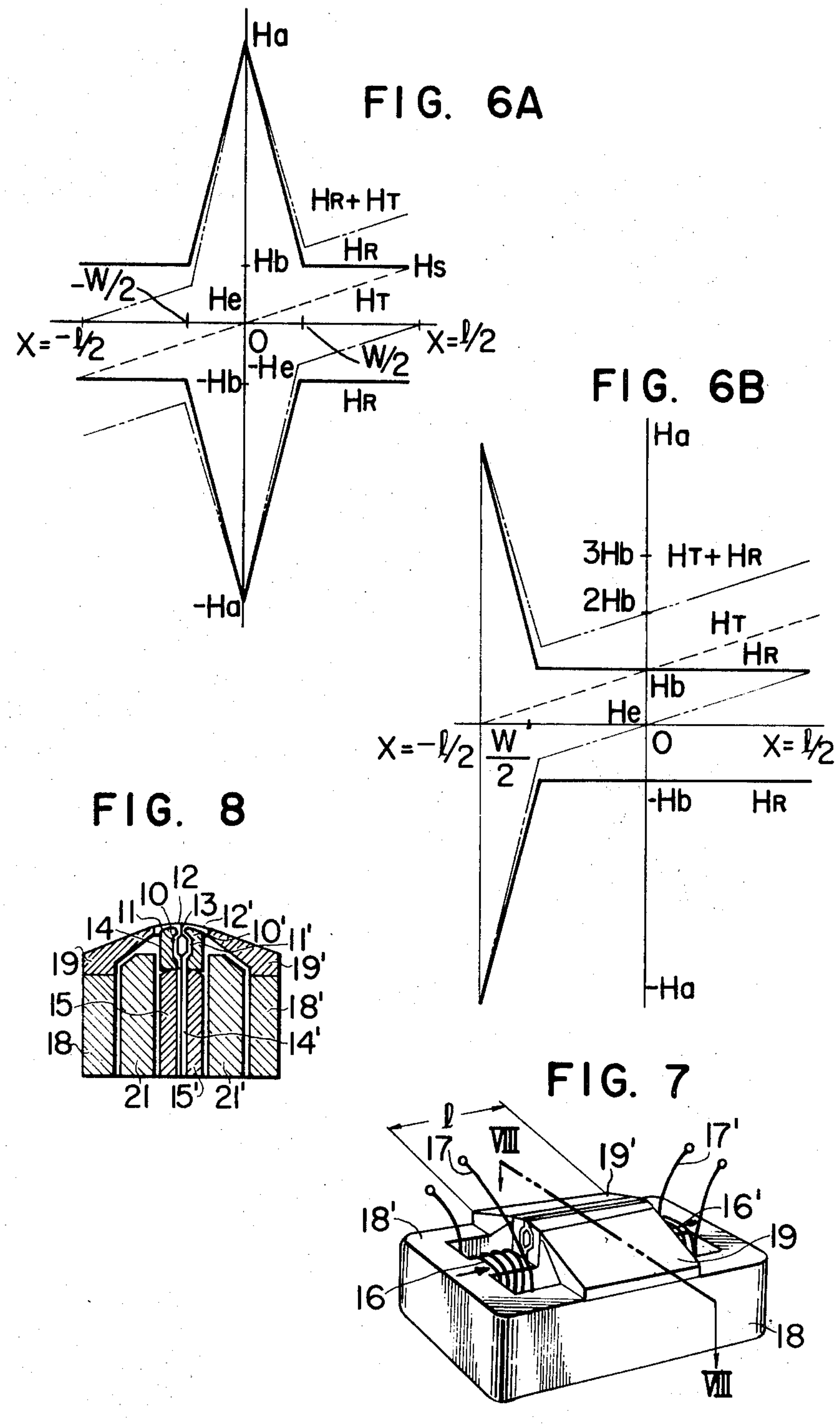
FIGS. 6A and 6B are diagrams showing the scanning magnetic field effected on the recording medium.
FIG. 7 is a perspective view of an embodiment of the magnetic head in accordance with the present invention.
FIG. 8 is a cross-sectional view taken along the line VIII — VIII in FIG. 7.

Now referring to the drawing, a known scanning magnetic head comprises a couple of magnetic pole-pieces 1 and 1′ arranged in parallel to each other and magnetically connected at the ends thereof so as to form a magnetic core 2, and a couple of coils 3 and 4 disposed at the magnetically connected portion of the pole-pieces 1 and 1′. A scanning current is applied to the coils 3 and 4 so that the magnetic flux generated thereby is directed in the same direction in the magnetic core 2 as shown by the arrows in FIG. 1. A thin plate 5 of soft magnetic material is disposed on the magnetic pole-pieces 1 and 1′ to cover both pole-pieces except the ends thereof where the coils 3 and 4 are wound. On the thin plate 5 of the soft magnetic material is disposed a lead wire 6 in parallel to the pole pieces 1 and 1' to provide a recording signal by the electric current flowing therethrough.

The recording medium 7 like a magnetic recording tape is passed in contact with the lead wire 6 in the direction perpendicular to the longitudinal direction of the lead wire 6 as shown in FIG. 2.

The principle of operation of the magnetic head of the present invention will now be described in detail. In the case that the longitudinal direction of the soft magnetic thin plate 5 is taken as an x-axis with the central position thereof as a point of origin, $x=o$, the magnetic field distribution along the x-axis effected by the magnetic flux made by the coils 3 and 4 as shown in FIG. 1 is represented by the straight lines HA and HB in the graph of FIG. 3. Accordingly, the magnetic field impressed on the soft magnetic thin plate 5 that is the composition of the magnetic fields HA and HB is represented by the straight broken line HT passing through the original point of the co-ordinate in FIG. 3. This means that there is a point at the central portion of the thin plate 5 where the magnetic flux is zero. It should be noted that the point of the zero magnetic flux can be moved along the x-axis by making the magnitude of the current flowing through one of the coils 3 and 4 smaller than that flowing through the other.

Since the soft magnetic thin plate 5 is thin as well as small in its coercive force, the considerably high value $\mu a$ of the specific permeability at the low direct current magnetic field Hdc is reduced down to as small as $\mu b$ at the higher direct current magnetic field Hdc as shown in the diagram of the magnetic characteristic in FIG. 4.

In the construction of the magnetic head as shown in FIG. 1, the specific permeability of the thin plate 5 becomes $\mu b$ when the magnetic field HT in FIG. 3 becomes larger than He or smaller than —He and the permeability of the thin plate 5 is large at the central portion with the width W near the point of HT = 0. Only at the portion with the width W of the thin plate 5, is the magnetic flux as shown in FIG. 2 is produced by the lead wire 6 according to the recording signal and the magnetic recording medium 7 passing thereby is recorded with the magnetic recording signal.

The typical magnetic characteristic of the magnetic recording medium 7 is shown in FIG. 5. Within the reversible range of the magnetic field H between —Hr and +Hr, there is left no residual magnetism. Out of the reversible range, where the magnetic field H is larger than + Hr or smaller than —Hr, the residual magnetism is retained in the recording medium. Out of the maximum magnetic field where the magnetic field is larger or smaller than the coercive force ±Hc, the maximum residual magnetism remains in the recording medium.

It is necessary that the recording magnetic field should be varied by the recording signal over the range from Hr to Hc according to the variation of the specific permeability from $\mu a$ to $\mu b$ of the soft magnetic thin plate 5, in order to obtain a sufficient degree of discrimination.

In the actual operation of the magnetic head, the magnetic field effecting the recording medium 7 differs on the different points as shown in FIG. 6A and the composite magnetic field (HR + HT) of the envelope HR of the signal magnetic field and the scanning magnetic field HT) effects the recording medium 7 consequently.

Therefore, in the case that the point where the scanning magnetic field HT becomes zero is at the point $x = l/2$ or $x = -l/2$, the maximum scanning magnetic field is impressed on the recording medium at the position where $x = -l/2$ or $x = l/2$, as clearly shown in FIG. 6B. The maximum magnetic field impressed on the recording medium in this cased becomes $|Hb + 2Hs|$, where Hb is a signal magnetic field at the saturated position on the soft magnetic thin plate 5, and Hs is a scanning magnetic field at the point of $x = l/2$ in the case that the scanning field becomes zero at the point of $x=o$.

On account of the above fact, the composite magnetic field is recorded on the recording medium unless the composite magnetic field (HR + HT) is smaller than the reversible magnetic field Hr for the magnetic recording medium shown in FIG. 5.

In the case that the specific permeability of the magnetic thin plate 5 is reduced down to $\mu b$ when the magnetic field is He, the maximum scanning magnetic field Hs is represented by $Hs = He \cdot l/W$.

Actually, the value of the Hs is so great that it is difficult to obviate the influence of the scanning magnetic field on the recording medium in the recording operation.

In the case of the magnetic head having a construction that both magnetic poles for saturating the magnetic thin plate are disposed in the vicinity of the recording medium, it is difficult not only to obviate the influence of the scanning magnetic field on the recording medium but also to accomplish both the sufficient degree of discrimination and saturation in the magnetic thin plate.

An embodiment of the scanning magnetic head in accordance with the present invention wherein the above-described difficulties are obviated is shown in FIGS. 7 and 8. A couple of head components 10 and 10' made of nonmagnetic material are provided with grooves 11 and 11' respectively and substantially U-shaped. The couple of U-shaped head components 10 and 10' are disposed in face-to-face relation at the groove thereof and covered with magnetic thin layer 12 and 12' on the top and sides surfaces thereof. The magnetic thin layer 12 and 12' on the surface including the groove 11 and 11' of the head components 10 and 10' is extended downward to project out of the components 10 and 10'. Between the surfaces facing each other of the head components 10 and 10' is sandwiched a gap spacer 13 at the top end portion thereof. The extended magnetic thin layers 14 and 14' downwardly extending from the magnetic thin layers 12 and 12' covered on the head components 10 and 10' are sandwiched by a couple of magnetic plates 15 and 15' having length longer than the length $l$ of the head components 10 and 10' in the direction normal to the U-shaped section and being located underneath the head components 10 and 10'. The couple of magnetic plates 15 and 15' are projected sideward out of the head components 10 and 10' as shown in FIG. 7 and the projected portions 16 and 16' of the magnetic plates 15 and 15' are provided with coils 17 and 17' wound therearound so that a couple of magnetic flux may be produced in a definite direction. The projected portions 16 and 16' of the magnetic plates 15 and 15' are magnetically connected by means of a couple of cores 18 and 18'. The magnetic thin layers 12 and 12' on the head components 10 and 10' are magnetically connected with the cores 18 and 18' through a couple of cores 19 and 19' extending along the whole length of the head components 10 and 10' between the head components 10 and 10' and the cores 18 and 18'. The magnetic thin layers 12 and 12' covered on the head components 10 and 10' are provided at the portion thereof located above the grooves 11 and 11' of the head components with signal coils 20 and 20' connected in series with each other. (not shown in FIGS. 7 and 8) The reference numerals 21 and 21' designate a couple of non-magnetic members used for assembling the magnetic head construction.

Figure 9:
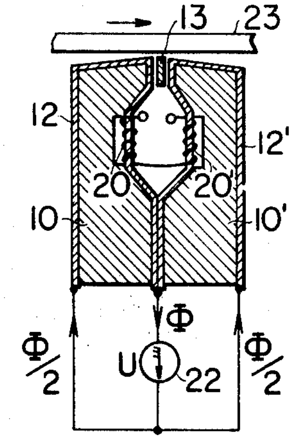
FIG. 9 is an enlarged sectional view of a part of the embodiment of the magnetic head shown in FIG. 7.
Figure 10:
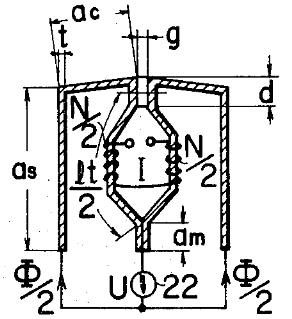
FIG. 10 is a view showing an electrical connection of a part for exciting the magnetic thin plates in the part shown in FIG. 9.

As shown in FIG. 9, illustrating the cross section of the head components 10 and 10' incorporated in the magnetic head construction in accordance with the present invention normal to the longitudinal direction, the signal coils 20 and 20' are wound around the thin layers 12 and 12' so that the magnetic flux by the coils may be doubled at the head gap spacer 13. And the source of the magnetomotive force 22, actually the coils 17 and 17', for the magnetomotive force U for scanning is provided in the head in a symmetrical arrangement with respect to the head gap spacer 13. The portion for exciting the magnetic thin layers 12 and 12' in the construction shown in FIG. 9 can be illustrated as shown in FIG. 10. And the magnetic equivalent circuit of the portion shown in FIG. 10 can be illustrated approximately as shown in FIG. 11.

Figure 11:
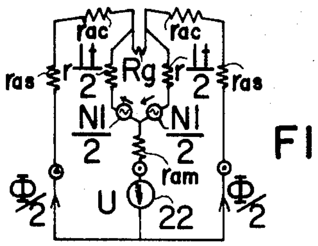
FIG. 11 is a view showing an equivalent circuit of the electrical connection shown in FIG. 10.

In FIGS. 10 and 11, the magnetic reluctance per a unit length of the magnetic thin layers 12 and 12' is represented by the reference character *r*, and the magnetic flux of the scanning magnetic field acting on the magnetic thin layer is indicated by Φ.

In the case that the magnetic thin layers 12 and 12' are disposed in the symmetrical relation with respect to the head gap spacer 13, the magnetic flux flowing through one of the magnetic thin layer becomes Φ/2.

By constructing the magnetic head as described above, only the scanning magnetic field, $HsB = ra_c \Phi/2$, is made to effect on the recording medium 23 and the influence of the scanning magnetic field on the recording medium can be much reduced. Where the reference character $a_c$ is the length along which the recording medium 23 and the magnetic thin layer 12 are in contact with each other at the one side of the gap portion.

Figure 12A:
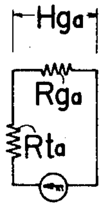
FIGS. 12A and 12B are views of equivalent circuits of a part of the embodiment of the magnetic head shown in FIG. 7 for recording signals on the recording medium.
Figure 12B:
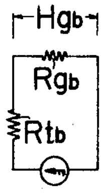

On the other hand as for the signal magnetic field, the equivalent magnetic circuits of the electrical connection in the case that the specific permeability of the magnetic thin plate 12 and 12' are μa and μb respectively are illustrated in FIGS. 12A and 12B, wherein the recording with medium 23 is recorded the signal by the magnetomotive force NI of the signal coils 20 and 20'.

The gap magnetic field Hga and Hgb in the case shown in FIGS. 12A and 12B respectively is represented by the following formulas:

$$Hga=\frac{NI}{g}\cdot\frac{1}{1+\frac{Rta}{Rga}}$$

$$Hgb=\frac{NI}{g}\cdot\frac{1}{1+\frac{Rtb}{Rgb}}.$$

Accordingly, the degree of discrimination (Hga/Hgb) is represented as follows, $$\frac{Hga}{Hgb}=\frac{1+\frac{Rta}{Rgb}}{1+\frac{Rta}{Rga}}$$

$$\frac{Hga}{Hgb}=\frac{1+\frac{Rgb}{Rtb}}{\frac{\mu b}{\mu a}+\frac{Rgb}{Rtb}}$$

$$\frac{Rgb}{Rtb}=\frac{\mu bgt}{dlt} \qquad (1)$$

Therefore, in the case of the material in which the value of (μb/μa) is known, the range in which the ratio of the reluctance Rgb at the head gap to the reluctance Rtb of the magnetic thin plate is to be taken can be determined in order to obtain the required degree of discrimination (Hga/Hgb).

The reversible magnetic field Hr of the typical recording medium at the present time is 100 to 150 oersted, and accordingly, magnetic fields as large as 450 to 1000 oersted are required to sufficiently record the recording medium.

If the influence of the scanning magnetic field as shown in FIG. 6 is taken into consideration, the degree of discrimination Hga/Hgb is required to be larger than the above. Thus, the degree of discrimination is required to be larger than 3 at least, that is $Hga/Hgb > 3$.

Figure 13:
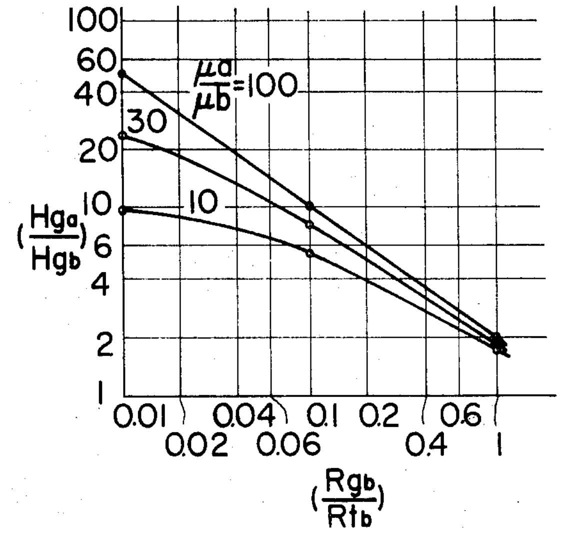
FIG. 13 is a diagram showing the operation characteristic of the embodiment of the magnetic head shown in FIG. 7.

Since the ratio μa/μb of the maximum specific permeability μa to the specific permeability after saturation of the magnetic thin plate becomes larger than 10, it is apparent from the diagram shown in FIG. 13 showing the relation of the value Hga/Hgb with the value Rgb/Rtb that the degree of discrimination of Hga/Hgb >3 can not be obtained unless $$Rgb/Rtb < 0.3 \qquad (2).$$

Since the discrimination of the recording magnetic field is conducted by saturation and unsaturation at the magnetic thin plate in the scanning magnetic head of this invention, it is required that the magnetic thin plate is not saturated under the signal magnetic field Hga. The magnetic flux density Ba in the magnetic thin plate when the signal magnetic field Hga is impressed thereon is represented by the formula $$Ba = \mu_o Hga \cdot (d/t) \qquad (3).$$

This magnetic flux density Ba should be not more than the saturated magnetic flux density Bs of the magnetic thin plate. Therefore, the ratio of the depth (*d*) of the head gap to the thickness (*t*of the magnetic thin plate should be represented by the following formula, $$d/t < Bs/\mu_o Hga \qquad (4).$$

By the formulas (1), (2) and (4) the ratio of the gap width (*g*) to the length *it* of the magnetic thin plate effective for the magnetic recording is required to satisfy the following formulas, $$3\mu b\cdot\frac{g}{lt}<\frac{d}{t}$$

$$\frac{d}{t}<\frac{Is}{\mu_o Hga} \qquad (5)$$

Figure 14A:
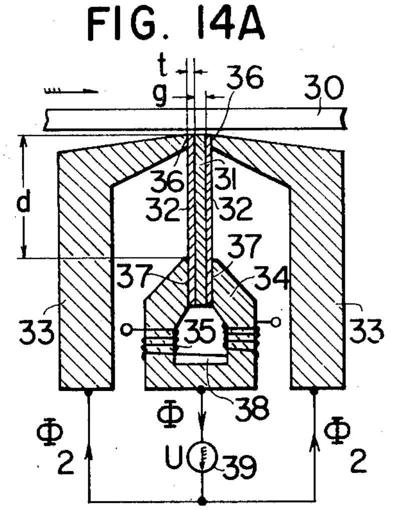
FIG. 14A is a cross-sectional view of another embodiment of the scanning magnetic head in accordance with the present invention.

In order to reduce the influence of the scanning magnetic field, another embodiment of the present invention was devised which is shown in FIG. 14A. A nonmagnetic gap spacer 31 is sandwiched by a couple of magnetic thin plates 32, and the upper portion thereof is magnetically connected at the both surfaces 36 thereof with a couple of magnetic members 33 of the shape as shown in FIG. 14A. The lower portion of the magnetic thin plates 32 sandwiching the nonmagnetic gap spacer 31 is magnetically connected at the both surfaces 37 thereof with a hollow magnetic member 34 made of magnetic material such as permalloy, ferrite and the like. The hollow magnetic member 34 is provided with a signal coil 35 at the opposite sides of the hollow portion 38 thereof so that a magnetic flux is effected at the gap portion thereof. And the source 39 of the magnetomotive force U for scanning is provided symmetrically on the magnetic member 34 with respect to the gap portion thereof. In the above-described embodiment of the recording head, the recording medium 30 is passed in contact with the upper portion of the gap thereof in the direction indicated with the arrow in FIG. 14A.

Figure 14B:
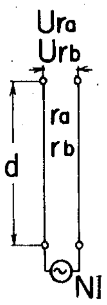
FIG. 14B is a view of an equivalent circuit of the second embodiment of the magnetic head shown in FIG. 14A.

The magnetic equivalent circuit of the signal recording portion of the electrical connection in the embodiment shown in FIG. 14A is represented by the distributed constant circuit as shown in FIG. 14B.

The transmission constants $\gamma a$ and $\gamma b$ when the specific permeability of the magnetic thin plate 32 is $\mu a$ and $\mu b$ respectively are represented by the following formulas, $$\gamma b=\left(\frac{2}{\mu bgt}\right)^{1/2}$$

$$\gamma a=\left(\frac{2}{\mu agt}\right)^{1/2}=\left(\frac{\mu b}{\mu a}\right)^{1/2}\gamma b \qquad (6).$$

The magnetomotive forces Ura and Urb at the top end portion 36 of the magnetic thin plate when the specific permeability of the magnetic thin plate is $\mu a$ and $\mu b$ are represented by the following formulas, where the magnetomotive force by the signal current impressed on the magnetic member 34 is NI, $$Ura = NI/\cosh \gamma ad \qquad (7)$$

$$Urb = NI/\cosh \gamma bd \qquad (8).$$

The degree of discrimination (Ura/Urb) is represented by $$Vra/Urb = \cosh \gamma bd / \cosh \gamma ad \qquad (9).$$

Figure 15:
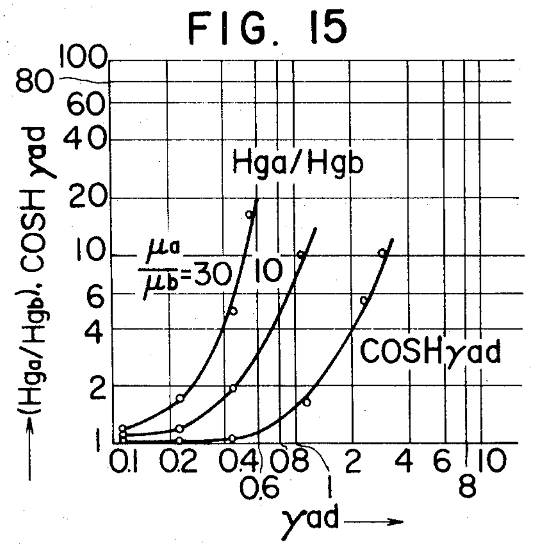
FIG. 15 is a diagram showing the operation characteristic of the second embodiment of the magnetic head shown in FIG. 14A.

As apparent from the formula (7), the value $\gamma ad$ is desired to be not more than 3 in order to effectively use the magnetomotive force $NI$ for recording. As shown in FIG. 15, when the value $\gamma ad$ becomes not less than 3, the magnetomotive force $Ura$ at the top of the magnetic thin layer becomes as small as not more than a tenth of NI. Consequently, the allowable range of the value $\gamma ad$ is represented by $$\gamma ad < 3 \qquad (10)$$

$$\left(\frac{2}{\mu agt}\right)^{1/2} d < 3 \qquad (11).$$

Though in the foregoing description of the present invention an embodiment of the scanning magnetic head has been described as to the example wherein the magnetic thin plate is used as a magnetic path, it should be noted that a nonmagnetic member coated with magnetic material such as permalloy can be substituted instead of the thin plate. An embodiment of the magnetic head employing a nonmagnetic member coated with magnetic material will now be described referring to FIGS. 16A, 16B and 16C.

Figure 16A:
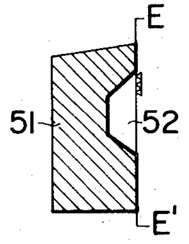
FIGS. 16A to 16C are views showing an embodiment of the method of making the head component employed in the magnetic head of the present invention.
Figure 16B:
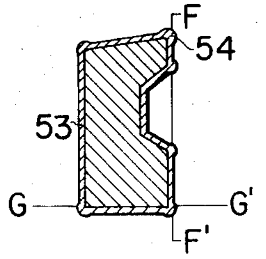
Figure 16C:
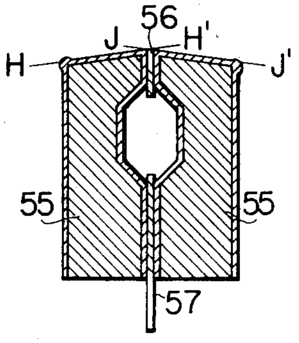

A nonmagnetic member 51 having length in the direction normal to the drawing sheet as shown in FIG. 16A is provided with a groove 52. The surface E – E′ including the groove 52 of the nonmagnetic member 51 is made to be plane so that it may be ground into a perfect plane. The nonmagnetic member 51 is coated with magnetic material such as permalloy through an electrodeposition process. In the electrodeposition process, the magnetic material is coated more at the corner of the member 51. Since such uneveness of the coating on the member is required to be eliminated in order to form an effective head gap, the member 51 with the coating is ground into a perfect plane F – F′ as shown in FIG. 16B. The coating of the magnetic material on the bottom surface of the member 51 as shown in FIG. 16B is removed along the line G – G′. A couple of pieces of the nonmagnetic members 51 coated with magnetic material are bound together interposing a nonmagnetic gap spacer 56 at the upper portion thereof and a magnetic gap spacer 57 at the lower portion thereof with a part of the latter projected out of the bottom 55 of the bound pieces of nonmagnetic members 51 as shown in FIG. 16C. The projected portion of the magnetic gap spacer 57 is to be used for impressing the scanning magnetic field therethrough. Then the upper surface of the bound head components is ground into a smooth surface at the line H – H′ and J – J′ as shown in FIG. 16C.

Figure 17A:
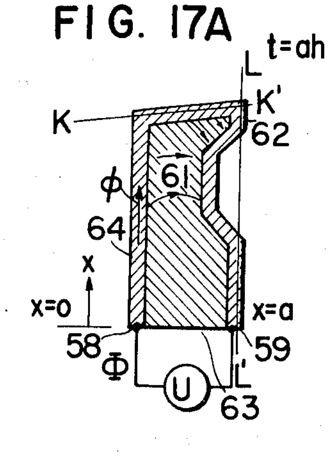
FIGS. 17A and 17B are cross-sectional views showing another type of the head component employed in the magnetic head of the present invention.
Figure 17B:
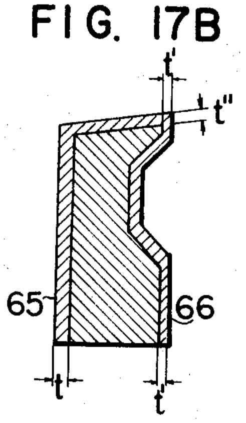
Figure 18:
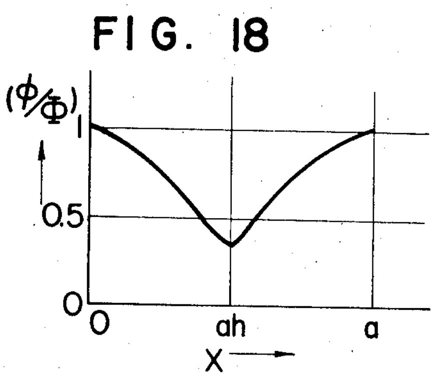
FIG. 18 is a diagram showing the characteristic of the magnetic head composed of the head components as shown in FIGS. 17A and 17B.

In the case that a magnetic thin layer 64 is provided on the surface of a nonmagnetic member 63 as shown in FIG. 17A and a magnetomotive force U is applied thereto from the bottom ends 58 and 59 of the thin layer 64 by a magnetomotive force source 60 of magnetic flux of Φ, there is a leakage at the upper portion 61 of the semi-magnetic member. This leakage of the magnetic flux is represented by the graph in FIG. 18 in which the magnetic flux at the top portion of the head component is reduced, where x-axis is taken along the surface of the head component as shown in FIG. 17A from the left bottom end 58, $x = o$, to the right bottom end 59, $x = a$, through the top portion, $x = ah$. Along the ordinate of the coordinate in FIG. 18 is plotted the ratio of the magnetic flux $\phi$ at the position represented by the value of $x$, the distance from the left bottom end 58 of the thin layer 64, to the applied magnetic flux Φ. The above leakage of the magnetic flux results in unsaturation at the top portion of the head component at the time of saturation at the bottom thereof. In order to obviate the above-described unsaturation at the top portion of the head component, the thickness $t'$ and $t''$ of the magnetic thin layer at the top portion thereof is made thinner than that $t$ of the layer at the bottom portion thereof as shown in FIG. 17B by grinding the surfaces K – K′ and L – L′ as shown in FIG. 17A. The reason for making the right bottom end portion 66 of the magnetic thin layer thinner than that of the left bottom end portion 65 thereof is that a magnetic gap spacer 57 is in contact with the right bottom end portion 66 when assembled into a head construction as shown in FIG. 16C. By constructing the head assembly as described hereinabove, it is made possible to sufficiently saturate the top portion of the head component to the extent required to discriminate the recording magnetic field.

In the case of making the main portion of the scanning magnetic head with a magnetic thin plate, how to heat treat the magnetic head assembly is one of the important practical problems in manufacturing the magnetic head in accordance with the present invention. An embodiment of the present invention which is formed so that the heat treating of the main portion thereof after assembling can be easily conducted is shown in FIG. 20A.

Figure 20A:
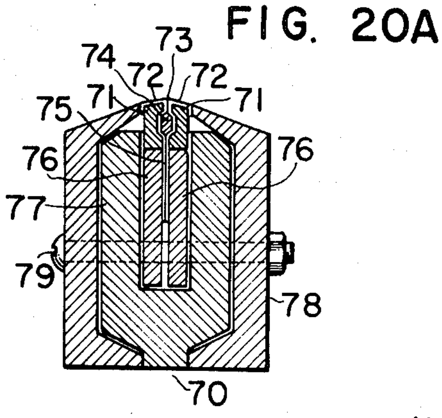
FIG. 20A is a cross-sectional view of the embodiment of the head shown in FIG. 19.

A couple of magnetic thin plates 72 are wound on the nonmagnetic members 71 respectively as shown in FIG. 20A. Between the couple of nonmagnetic members 71 and 71 are sandwitched a member 74 for forming a space for signal coils and a nonmagnetic gap spacer 73 to form a magnetic head assembly. A magnetic plate 75 extending downward from the bottom of the members 71 is sandwiched by a couple of pole-pieces 76 serving as the central magnetic pole for scanning, and the couple of pole pieces 76 and 76 are in turn sandwiched by a couple of nonmagnetic members 77 of heat resisting material such as stainless steel. An end of the magnetic thin plates 72 and the lower end of the non-magnetic members 77 are sandwiched by a couple of pole pieces 78 serving as the opposite magnetic pole for scanning as shown in FIG. 20A. The head assembly as constructed above is tightly fixed into a unit by means of a bolt and nut 79. Then the member 74 for forming the space for signal coils is removed from the unit and the whole unit 70 is heat treated. Thus the head treating process after assembling is performed with ease. The member 74 may be removed from the unit after the unit is heat treated.

Figure 20C:
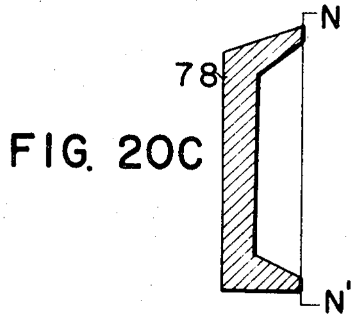
FIG. 20C is a cross-sectional view of another component of the magnetic head shown in FIG. 20A.
Figure 20B:
FIG. 20B is a cross-sectional view of a component of the magnetic head shown in FIG. 20A.

The surface M – M′ of the nonmagnetic members 71 (FIG. 20B) and the surface N – N′ of the pole pieces 78 (FIG. 20C) are made into a plane so that the surfaces may be easily ground.

Figure 19:
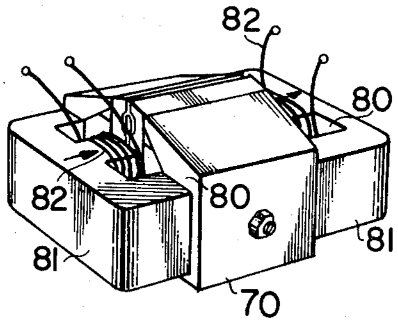
FIG. 19 is a perspective view of still another embodiment of the magnetic head in accordance with the present invention.

Now the means for impressing the scanning magnetic field on the magnetic head will be described referring to FIG. 19 and FIG. 20A. The end surfaces of the whole unit 70 of the magnetic head parallel to the plane of the drawing sheet are ground to a perfect plane 80 so that the scanning magnetic cores 81 and 81 may be brought into magnetical contact therewith as shown in FIG. 19. The scanning magnetic cores 81 and 81 are wound on with coils 82 and 82 respectively so that the magnetic field may be produced in the direction as shown by the arrow in FIG. 19, and so that the head gap 73 may be provided with a couple of symmetrical scanning magnetic fields. In the head construction as shown in FIG. 19, the grinding process can be easily performed and the magnetic contact between the components can be well accomplished since the surface to be in contact with each other are both plane surfaces.

Figures 21A, 21B, 22A, 22B:
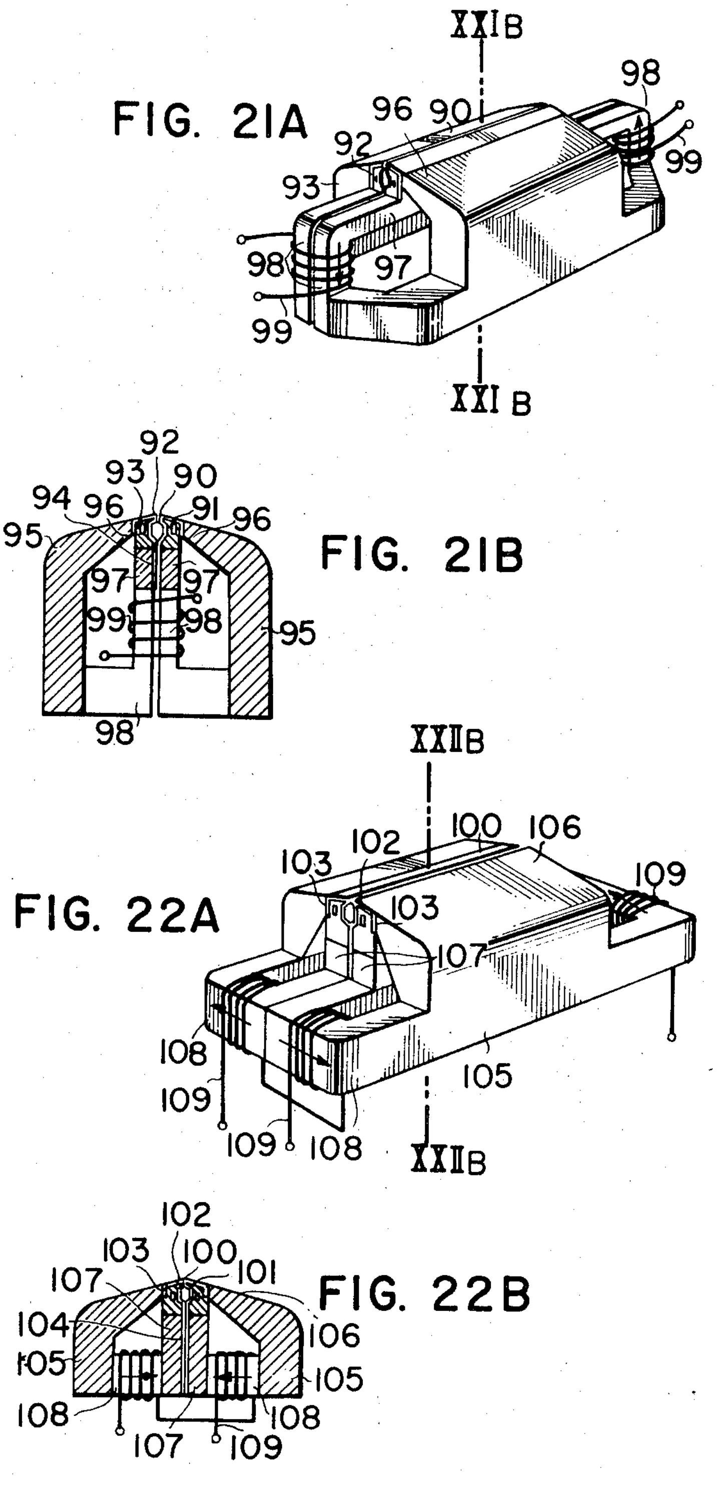
FIG. 21A is a perspective view of still another embodiment of the magnetic head in accordance with the present invention.
FIG. 21B is a cross-sectional view of the magnetic head shown in FIG. 21A.
FIG. 22A is a perspective view of a further embodiment of the magnetic head in accordance with the present invention.
FIG. 22B is a cross-sectional view of the magnetic head shown in FIG. 22A.

Another embodiment of the magnetic head in accordance with the present invention will now be described referring to FIGS. 21A and 21B.

The main magnetic head component 90 is interposed between a couple of scanning pole pieces 95 and 95. A couple of scanning coils 99 and 99 are wound around a couple of L-shaped extended portions 98 and 98 of the magnetic head component so that the magnetic flux may be produced in the head as shown by the arrows in the drawing. The outer ends 93 and 93 and the inner central portion 94 of the magnetic thin plate 92 provided on the nonmagnetic members 91 are sandwiched by the top end portions 96 of the pole pieces 95 and by the central pole pieces 97 as clearly shown in FIG. 21B illustrating the cross section of the head assembly as shown in FIG. 21A. Thus, the scanning magnetic fields are symmetrically provided on the head gap of the head assembly so that the influence of the scanning magnetic field on the recording medium may be reduced.

Still another embodiment of the magnetic head in accordance with the present invention will now be described referring to FIGS. 22A and 22B.

The main part 100 of the scanning head is interposed by a couple of scanning magnetic pole pieces 105 and 105 independently disposed on the opposite sides of the head gap. The scanning magnetic pole pieces 105 and 105 are provided with scanning coils 109 and 109 wound on the U-shaped extended portions 108 and 108 thereof so that the magnetic flux may be produced in the direction shown with the arrows in the drawing. Thus, the magnetic thin plate 102 is impressed with the scanning magnetic fields through four coils disposed on the opposite sides thereof. The outer ends 103 and 103 and the inner central portion 104 of the magnetic thin plate 102 provided on the nonmagnetic members 101 and 101 are sandwiched by the top end portions 106 and 106 of the pole pieces 105 and 105 and the central pole pieces 107 and 107 respectively as clearly shown in FIG. 22B illustrating the cross section of the head assembly shown in FIG. 22A. Thus, a couple of scanning magnetic fields are provided on the head gap of the head assembly symmetrically with respect to the gap so that the influence of the scanning magnetic field on the recording medium may be reduced.

Since the signal coils employed in the above embodiments of the present invention are disposed in symmetrical relation with each other, the signal coils are free from any external disturbance except the signal magnetic field. This is advantageous from the viewpoint of the signal-to-noise ratio.

Figure 23:
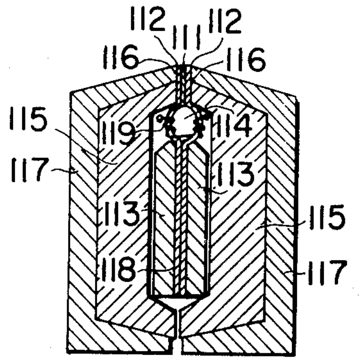
FIGS. 23 through 25 are cross-sectional views of other embodiments of the magnetic head in accordance with the present invention.

Now another embodiment of the present invention wherein the magnetic equivalent circuit is used for scanning as a distribution constant circuit will be described referring to FIG. 23.

A nonmagnetic gap spacer 111 is interposed between a couple of soft magnetic thin plates 112. The soft magnetic thin plates 112 and 112 are formed so that a hollow portion 114 may be provided under the head gap spacer 111 and the lower portions 118 of the soft magnetic thin plates 112 and 112 are sandwiched by a couple of central pole pieces 113 and 113 serving as pole pieces for magnetically scanning the recording medium. The portion of the soft magnetic thin plates 112 just above the hollow portion 114 thereof and the central pole pieces 113 sandwiching the portion thereof just below the hollow portion 114 are sandwiched by a couple of nonmagnetic members 115 and 115 made of heat resistive material such as stainless steel. The top portion 116 of the soft magnetic thin plates 112 and the heat resistive nonmagnetic members 115 are tightly sandwiched by a couple of magnetic pole pieces 117 and 117 serving as the outer pole pieces for scanning the recording medium. A signal coil 119 is disposed at the hollow portion 114 so that the magnetic flux may be produced at the heat gap. The scanning magnetic field is provided between the central pole pieces 113 and the outer pole pieces 117. According to the head construction as shown in FIG. 23, the soft magnetic thin plate can be heat treated after processing.

Figure 24:
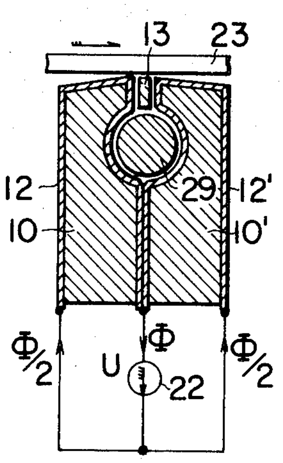

Though in the above embodiments of the present invention, the signal magnetic field is provided through the coils, the coils such as those 20 and 20' in FIG. 10 may be substituted for a nonmagnetic conductor 29 as shown in FIG. 24 which is interposed between a couple of cores 10 and 10' coated with magnetic thin layers 12 and 12'.

Figure 25:
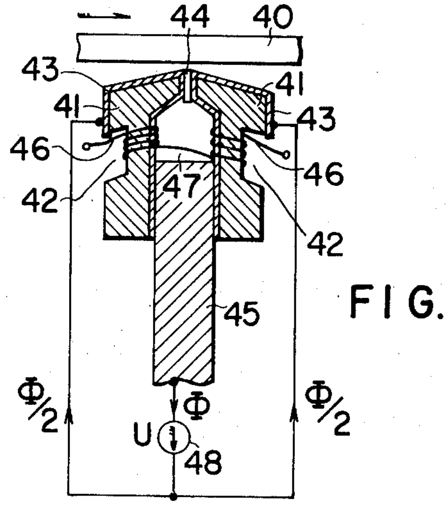

A still another embodiment of the magnetic head in accordance with the present invention will now be described referring to FIG. 25. A couple of non-magnetic members 41 and 41 having inversed-L-shaped section covered with magnetic thin layer 43 are disposed in symmetrical relation with a nonmagnetic head spacer 44 and a magnetic member 45 interposed therebetween, as shown in FIG. 25. The nonmagnetic members 41 and 41 are provided with grooves 42 and 42 respectively so that signal coils 46 and 46 may be wound thereon to produce a magnetic flux at the head gap.

A magnetomotive force source 48 for providing a magnetomotive force U is connected with the head assembly so that the head gap may be symmetrically provided with the magnetomotive force. Thus, the recording medium 40 passing in the direction indicated by the arrow in the drawing is magnetized.

In the last embodiment of the magnetic head in accordance with the present invention shown in FIG. 25, it is advantageous that the leakage of the signal magnetic field at the head component can be reduced by the provision of the groove 42 thereon.

Moreover, in the embodiment shown in FIG. 25, it is advantageous that the magnetic field for scanning can be easily impressed thereon since the wide magnetic gap spacer 45 is projected out of the nonmagnetic members 41 and 41.

It is another advantage of the last embodiment that the magnetic thin plate 43 is not required to be bent into a complicated form which results in easiness in constructing the magnetic head assembly.

In accordance with the magnetic head of the present invention in which a couple of nonmagnetic members having a recessed portion on one side thereof and covered with a magnetic thin layer on the top and side surfaces thereof are disposed in face-to-face relation interposing a nonmagnetic head spacer therebetween with the recessed portion faced inwardly, another part of the magnetic thin layers on the non-magnetic members are magnetically connected with each other, the magnetic thin layers are provided with signal magnetic field at the recessed portion of the nonmagnetic member on which it is coated so that the head gap is impressed with the signal magnetic field, and the magnetic thin layers on the opposite sides of the head gap is provided with a couple of symmetrical scanning magnetic fields, the influence of the scanning magnetic field on the recording medium is small and the degree of discrimination of the recording region from the non-recording region of the magnetic field is made large.

What is claimed is:

1. A scanning magnetic head comprising a first closed magnetic circuit including a nonmagnetic head gap spacer to be in contact with the recording medium and having a width corresponding to the width of said recording medium, second and third closed magnetic circuits including a part of said first closed magnetic circuit and being disposed on the opposite sides of said head gap spacer, means for providing a signal magnetic field to be recorded on said recording medium into said first closed magnetic circuit, and means provided on said second and third closed magnetic circuits and at the sides of the width of said first closed magnetic circuit for providing a couple of scanning magnetic fields having the same direction, the intensity thereof varying as time elapses, into said second and third closed magnetic circuits, whereby said couple of scanning magnetic fields are so introduced into said first closed magnetic circuit in opposite directions to each other that each of the fields is symmetrical with respect to said head gap, the intensity thereof being decreased gradually from one side to the other side of the width of said first closed magnetic circuit.

2. A scanning magnetic head comprising: a first closed magnetic circuit including a non-magnetic head gap spacer to be in contact with the recording medium, said first closed magnetic circuit consisting of a couple of nonmagnetic members having a recessed portion on at least one side surface thereof and having a magnetic coating on three surfaces thereof including said recessed portion disposed in face-to-face relation with said recessed portions faced inward, said nonmagnetic head gap spacer interposed between said magnetic coatings at one side of said recessed portion, and a means for magnetically connecting said magnetic coatings interposed therebetween at the other side of said recessed portion; a second and third closed magnetic circuits including respectively said magnetic coatings at said recessed portions and being disposed on the opposite sides of said head gap; a means for impressing a signal magnetic field on said magnetic coatings at said recessed portions of said first closed magnetic circuit so that the signal magnetic field may be provided on said head gap; and a means for providing a couple of scanning magnetic fields symmetrical with respect to said head gap on said second and third closed magnetic circuits.

3. A scanning magnetic head comprising: a first closed magnetic circuit comprising a nonmagnetic plate interposed between a couple of magnetic plates which are in contact with a first and second magnetic cores at an end thereof and are magnetically connected with each other through a third magnetic core so that said nonmagnetic plate may be a head gap spacer; a second closed magnetic circuit disposed on one side of said nonmagnetic plate, said second closed magnetic circuit consisting of said first and third magnetic cores magnetically connected with each other; a third closed magnetic circuit disposed on the other side of said nonmagnetic plate, said third closed magnetic circuit consisting of said second and third magnetic cores magnetically connected with each other; a means for providing a signal magnetic field on said first closed magnetic circuit; and a means for providing a couple of scanning magnetic fields symmetrical with respect to said head gap on said second and third closed magnetic circuits.

4. A scanning magnetic head comprising: a first closed magnetic circuit comprising a couple of nonmagnetic members having a recessed portion on at least one side surface thereof and having a magnetic coating on three surfaces thereof including said recessed portion disposed in face-to-face relation with said recessed portions faced inward said said magnetic coating being extended out of said surface including said recessed portion, a nonmagnetic head gap spacer interposed between said magnetic coatings at one side of said recessed portion, and a means for magnetically connecting said magnetic coatings at the other side of said recessed portion, said means being a first couple of magnetic plates sandwiching the extended portion of said magnetic coatings; a second and third closed magnetic circuits including a part of said first closed magnetic circuit and being disposed on the opposite sides of said head gap spacer, said second and third magnetic circuits being composed of a second couple of magnetic plates connected with said magnetic coatings on the surface of said nonmagnetic members having a recessed portion and means for magnetically connecting said second couple of magnetic plates with said first couple of magnetic plates; a couple of coils wound on said first couple of magnetic plates for providing a scanning magnetic field; and a couple of coils wound on said magnetic coatings at said recessed portion for providing a signal magnetic field.

5. A scanning magnetic head comprising a couple of magnetic plates having U-shaped curved portion at the middle portion thereof, a nonmagnetic plate serving as a head gap spacer interposed between said magnetic plates at one side of said curved portion thereof, a first and second magnetic cores holding said magnetic plates interposing said nonmagnetic plates therebetween, a third and fourth magnetic cores magnetically connecting said magnetic plates at the other side of said curved portion, means for magnetically connecting an end of said first and second magnetic cores with an end of said third and fourth magnetic cores for forming a couple of closed magnetic circuits on the opposite sides of said head gap, a couple of coils disposed on said magnetic plates at said curved portion thereof for providing signal magnetic field on said head gap, and a means for providing a couple of scanning magnetic fields symmetrical with respect to said head gap on said closed magnetic circuits disposed on the opposite sides of said head gap.

6. A scanning magnetic head as claimed in claim 2 wherein said means for providing signal magnetic field is a nonmagnetic conductor disposed between said magnetic coatings at the recessed portion and impressed with a signal current.

7. A scanning magnetic head comprising: a first closed magnetic circuit including a head gap, said first closed magnetic circuit comprising a couple of inversed-L-shaped nonmagnetic members covered with magnetic thin layer, a nonmagnetic plate interposed by the top ends of said nonmagnetic members, and a magnetic plate magnetically connecting the other ends of said nonmagnetic members; a couple of coils provided on said magnetic thin layer for providing a signal magnetic field for recording; a means for magnetically connecting the end of said magnetic thin layer with said magnetic plate to form a second and third closed magnetic circuits on the opposite sides of said head gap; and means for providing a scanning magnetic field symmetrical with respect to said head gap on said second and third closed magnetic circuits.

8. A scanning magnetic head as claimed in claim 2 wherein the thickness of said magnetic coatings at the portion to be in contact with the recording medium is made smaller than that of the residual portion thereof.

9. A scanning magnetic head as claimed in claim 2, wherein said head gap included in said first closed magnetic circuit and said magnetic coating constituting said first closed magnetic circuit are so constructed that the ratio of the depth of said head gap to the thickness of said magnetic coating is smaller than the ratio of the saturated magnetic flux density in said magnetic coating to the magnetic flux density in said head gap.

10. A scanning magnetic head as claimed in claim 2, wherein said head gap included in said first closed magnetic circuit and said magnetic coating constituting said first closed magnetic circuit are so constructed that three times the product of the ratio of the gap width of said head gap to the length of said first magnetic circuit which is effective for said signal magnetic flux and the relative permeability of said magnetic coating when saturated is smaller than the ratio of the depth of said head gap to the thickness of said magnetic coating.

11. A scanning magnetic head, comprising:

first and second magnetic members, each having a recessed portion formed on one side face, said members being disposed in face to face relation, the recessed portions together defining a hollow interior portion;

a non-magnetic head spacer interposed between said first and second members to form a head gap in the portion of said magnetic head which engages a magnetic recording medium;

a first magnetic circuit comprising said first and second members and signal applying means for applying a signal magnetic field to the recessed portions of said first and second members for recording a signal on said recording medium; and a second magnetic circuit comprising a source for magnetomotive force and means connecting said source to said first and second members, respectively, for generating a coupled pair of symmetric oppositely directed scanning magnetic fields in the portions of the outer faces of said members disposed on opposite sides of said head spacer, wherein said oppositely directed scanning fields cancel each other within an area in which said signal magnetic field is recorded on said recording medium.

* * * * *